United States Patent
Atitallah et al.

(10) Patent No.: US 10,650,851 B1
(45) Date of Patent: May 12, 2020

(54) DATA STORAGE DEVICE SUSPENSION STRUT DAMPING SYSTEM

(71) Applicant: Seagate Technology LLC, Cupertino, CA (US)

(72) Inventors: Hassene Ben Atitallah, Eden Prairie, MN (US); Razman Zambri, Eden Prairie, MN (US); Ghazaleh Haghiashtiani, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/263,702

(22) Filed: Jan. 31, 2019

(51) Int. Cl.
*G11B 5/48* (2006.01)
*G11B 5/55* (2006.01)
*G11B 33/08* (2006.01)
*G11B 5/60* (2006.01)

(52) U.S. Cl.
CPC ............ *G11B 5/483* (2015.09); *G11B 5/4833* (2013.01); *G11B 5/4853* (2013.01); *G11B 5/4873* (2013.01); *G11B 5/5552* (2013.01); *G11B 5/6058* (2013.01); *G11B 33/08* (2013.01)

(58) Field of Classification Search
CPC ..... G11B 5/483; G11B 5/4833; G11B 5/4853; G11B 5/4873; G11B 5/6058; G11B 33/08
USPC .............................................. 360/245–245.5
See application file for complete search history.

(56) References Cited

U.S. PATENT DOCUMENTS

| 9,042,056 | B2 | 5/2015 | Hanya et al. | |
| 9,892,748 | B1 | 2/2018 | Ee et al. | |
| 10,109,302 | B1* | 10/2018 | Shinohara | G11B 5/1278 |
| 10,121,497 | B1* | 11/2018 | Takahashi | G11B 5/1278 |
| 2014/0078621 | A1* | 3/2014 | Miller | G11B 5/4826 360/244.2 |
| 2014/0098440 | A1* | 4/2014 | Miller | G11B 5/4826 360/86 |
| 2016/0218728 | A1* | 7/2016 | Zhu | G11B 5/235 |
| 2019/0120320 | A1* | 4/2019 | Donaldson | F16F 15/073 |

OTHER PUBLICATIONS

G. W. Bohannan, et al., "Piezoelectric Polymer Actuators in a Vibration Isolation Application," Smart Structures and Materials 2000: Electroactive Polymer Actuators and Devices (EAPAD), 2000, pp. 331-342, vol. 3987, International Society for Optics and Photonics.

Munehiro Date, et al., "Electrically Controlled Elasticity Utilizing Piezoelectric Coupling," Journal of Applied Physics, Jan 15, 2000, pp. 863-868, vol. 87, No. 2, American Institute of Physics.

Gustavo Luiz C. M. de Abreu, et al., "System Identification and Active Vibration Control of a Flexible Structure," Journal of the Brazilian Society of Mechanical Sciences and Engineering, 2012, pp. 386-392, vol. 34, Special Issue.

(Continued)

*Primary Examiner* — Allen T Cao
(74) *Attorney, Agent, or Firm* — Hall Estill Attorneys at Law

(57) ABSTRACT

A data storage device can employ a gimbal tongue flexure suspended from a load beam with a transducing head mounted to the gimbal tongue flexure. The transducing head can be separated from a magnetic recording medium by an air bearing. At least one active or non-active damper may be positioned on a strut of the gimbal tongue flexure.

20 Claims, 4 Drawing Sheets

(56) References Cited

OTHER PUBLICATIONS

Francesco Dell'isola, et al., "Passive Damping of Beam Vibrations Through Distributed Electric Networks and Piezoelectric Transducers: Prototype Design and Experimental Validation," Smart Materials and Structures, 2004, 299-308.
E. Fukada, et al., "Sound Isolation by Piezoelectric Polymer Films Connected to Negative Capacitance Circuits," IEEE Transactions on Dielectrics and Electrical Insulation, Apr. 2004, pp. 328-333, vol. 11, No. 2, IEEE.
Meiping Sheng, et al., "Experimental Investigation of Active Vibration Control on Plate Structures Using Laminated PVDF Actuators," Applied Science and Technology (IBCAST), 14th International Bhurban Conference, 2017, pp. 671-674, IEEE.
Doug Sun and James K. Mills, Combined PD Feedback and Distributed Piezoelectric-Polymer Vibration Control or a Single-Link Flexible Manipulator, Intelligent Robots and Systems, 1998, pp. 667-682, vol. 1, IEEE.
Oliver Thomas, et al., "Performance of Piezoelectric Shunts for Vibration Reduction," Smart Materials and Structures, 2012, pp. 1-16, IOP Publishing Ltd.
Yahong Zhang, et al., "Adaptive Vibration Control of a Cylindrical Shell with Laminated PVDF Actuator," Acia Mechanica, 2010, pp. 85-98.

\* cited by examiner

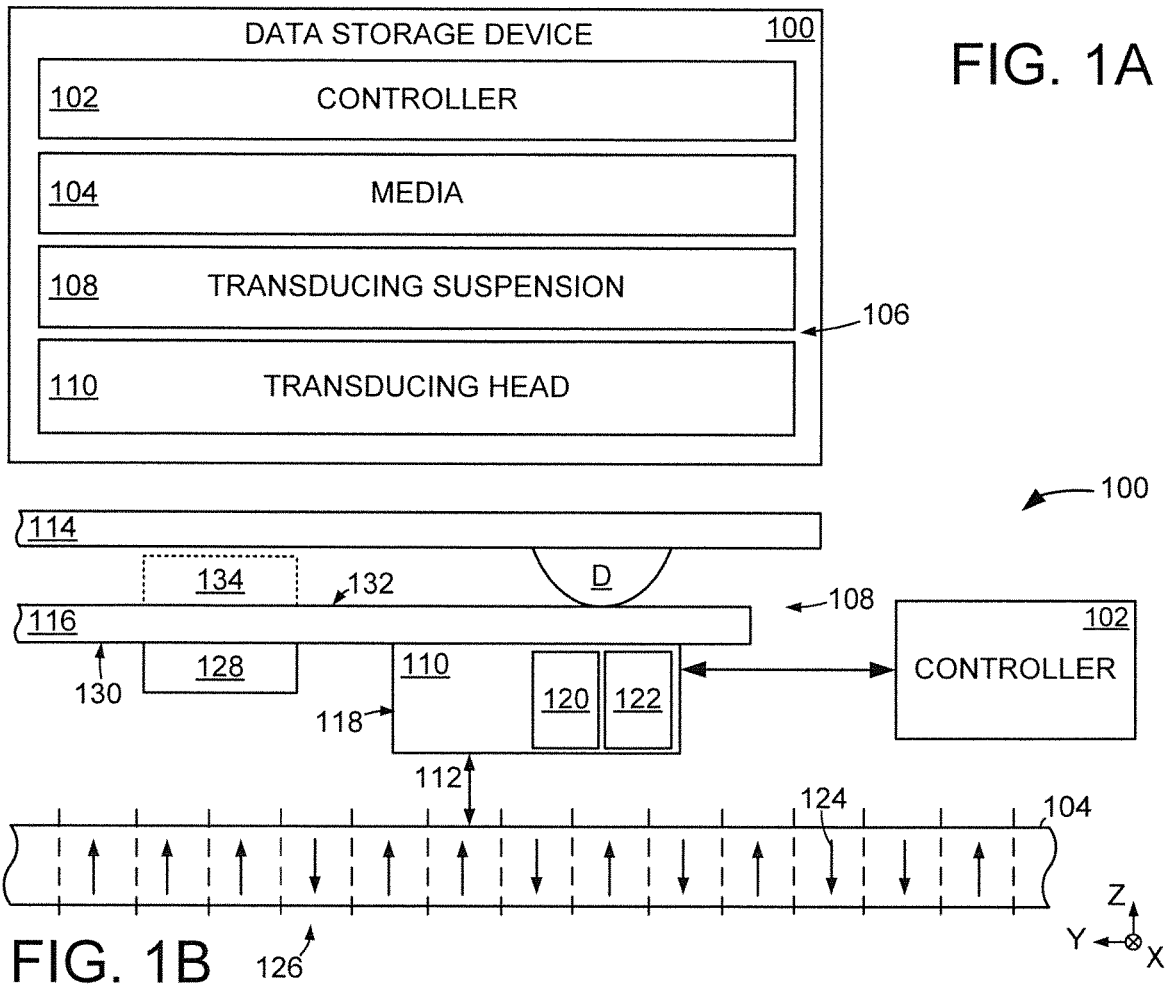
FIG. 1A
FIG. 1B
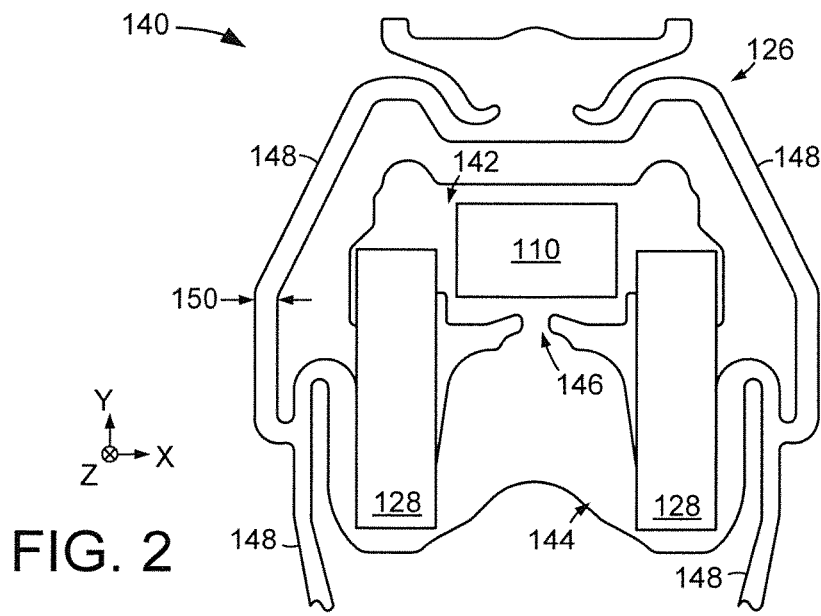
FIG. 2

US 10,650,851 B1

DATA STORAGE DEVICE SUSPENSION STRUT DAMPING SYSTEM

SUMMARY

In accordance with some embodiments, a data storage device has a gimbal tongue flexure suspended from a load beam with a transducing head mounted to the gimbal tongue flexure and an active damper positioned on a strut of the gimbal tongue flexure. The transducing head can be separated from a magnetic recording medium by an air bearing.

Other embodiments configure a data storage device with a gimbal tongue flexure suspended from a load beam with a transducing head mounted to the gimbal tongue flexure and a non-active damper positioned on a strut of the gimbal tongue flexure. The transducing head can be separated from a magnetic recording medium by an air bearing.

A data storage device is operated, in various embodiments, with a first active damper arranged on a first strut of a gimbal tongue flexure that is suspended from a load beam with the gimbal tongue flexure supporting a transducing head an air bearing distance from a magnetic recording medium. Encountering at least one frequency with the first active damper prompts conversion of the at least one frequency to an electrical signal with the first active damper that is subsequently altered with a damping component connected to the first active damper. The altered electrical signal induces mechanical motion of the first active damper with that alters physical motion of the gimbal tongue flexure.

BRIEF DESCRIPTION OF THE DRAWINGS

FIGS. 1A and 1B respectively convey portions of an example data storage device in which various embodiments may be practiced.

FIG. 2 shows portions of an example transducing assembly configured in accordance with assorted embodiments.

DETAILED DESCRIPTION

Figure 3:
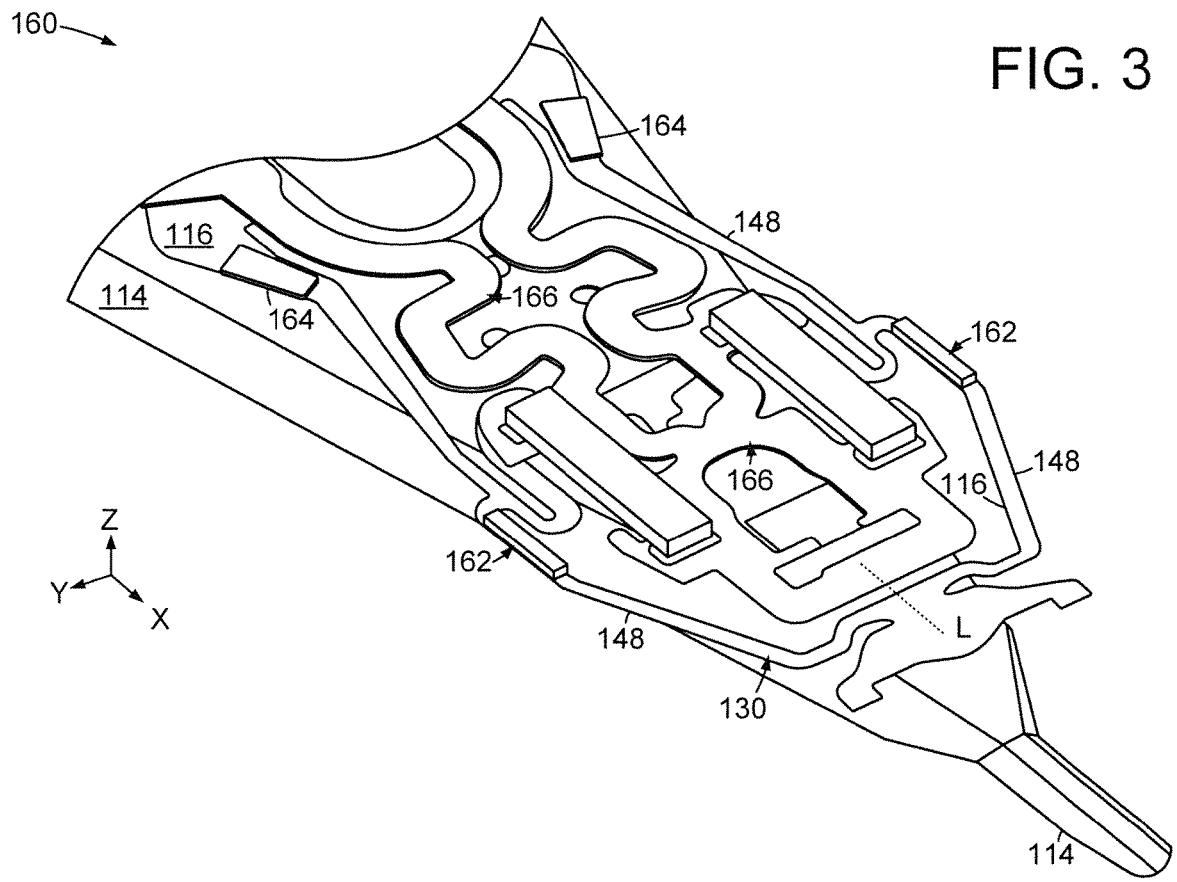
FIG. 3 displays portions of an example transducing assembly arranged in accordance with some embodiments.

Various embodiments are generally directed to data transducing suspensions of a data storage device that have optimized frequency and vibration response.

Greater industry and consumer demand for increased data storage capacity in combination with faster data access times and heightened data reliability has emphasized the structural and operational tolerances of a data storage device. By placing data bits closer together on a magnetic media, for instance, less non-magnetic buffer material exists between adjacent data bits than in data storage devices with less data capacity. As a result, data bit accessing components are allowed less motion, vibration, and resonance to provide fine resolution physical positioning over one or more selected data bits. Hence, there is a continued interest in damping systems for data storage devices that increase physical resiliency to vibrations and frequencies encountered while accessing data bits.

Accordingly, a data storage device can be configured with one or more dampers positioned on a gimbal tongue strut to decrease a data transducing assembly's volatility in response to encountered frequencies and vibrations. The ability to customize a gimbal tongue strut damper allows a transducing assembly to have different operational characteristics that are catered to a particular data storage environment, such as enterprise, consumer, or cloud data storage environments. While the material, size, placement, and damping characteristics of a strut damper can be tuned, the reduced gain of resonance modes for a transducing assembly can provide optimized data storage performance, particularly in relatively volatile frequency environments.

Various portions of an example data storage device 100 are displayed in FIGS. 1A and 1B in which assorted embodiments of the present disclosure can be practiced. A data storage device 100 is not limited to the aspects displayed in FIGS. 1A and 1B, but can utilize at least one local controller 102, a magnetic data storage medium 104, and a transducing assembly 106 in a common housing. The transducing assembly 106 can be configured as a transducing suspension 108 that supports a transducing head 108 over selected regions of a data storage medium 104 to conduct data access operations, as directed by the local controller 102. It is noted that the local controller 102 can be any logical circuit, such as a microprocessor or programmable control circuitry.

FIG. 1B is a line representation showing portion of the example data storage device 100 arranged in accordance with some embodiments. The data storage device 100 positions the transducing head 108 to fly a predetermined air bearing distance 112 above the data storage medium 104 with the transducing suspension 108. The transducing suspension 108 can consist of at least a load beam 114 that supports a gimbal tongue 116 on which the transducing head 110 is mounted. The gimbal tongue 116 may contact a dimple (D) to allow controlled motion while flying above the spinning data storage media 104, but such configuration is not required or limiting.

As shown, the transducing head 110 can consist of a slider 118 that supports at least a data reader 120 and data writer 122. The transducing suspension 108 can respond to a local, and/or remote, controller to move in the X-Y plane to position the transducing head 110 over at least one data bit 124 located in a data track 126 of the data storage medium 104. Fine resolution physical movement of the transducing head 110 can be facilitated by one or more microactuators 128 that can be positioned on an air bearing side 130 of the gimbal tongue 116 or a load beam side 132 of the gimbal tongue, as conveyed by segmented region 134.

FIG. 2 depicts top view portions of an example transducing assembly 140 that can be employed in the data storage device 100 of FIGS. 1A and 1B in accordance with some embodiments. FIG. 3A shows how a gimbal tongue 116 can be configured with a slider portion 142 connected to a base portion 144 via a pivot portion 146. The gimbal tongue 116 is further shaped with struts 148 that provide rigidity when a microactuator 138 is activated to induce movement of the slider portion 152 in the X-Y plane.

It is contemplated that a single microactuator 128 can be affixed to the gimbal tongue 116 to provide transducing head 110 movement in the X-Y plane about the pivot portion 146. However, control of motion with a single microactuator 128 can be difficult, which jeopardizes the operation of the transducing assembly 140, such a fly height, vibration resonance, and X-Y plane physical movement resolution. Thus, multiple separate microactuators 148 can be concurrently utilized, as shown in FIG. 2 in a configuration that can be characterized a co-located microactuation.

Such separate microactuators 128 can provide increased physical control and data access performance than with a single microactuator 128, but can struggle to provide a range of motion in the X-Y plane that is conducive to optimal data storage performance. That is, the mechanical stroke sensitivity to applied voltage can be limited in co-located microactuation to a lateral extent in the X-Y plane that is less than the physical range possible via the configuration of the slider 142, base 144, and pivot 146 portions of the gimbal tongue 116. In other words, the slider portion 112 could physically rotate in the X-Y plane more than is allowed by the microactuators 128 due to the microactuator's 128 sensitivity to applied voltage.

While the voltage sensitivity of a microactuator 128 may be increased by utilizing highly sensitive materials in the construction of the microactuator 128, the reliability and resultant physical behavior of such highly sensitive materials can be less than ideal. Thus, various embodiments construct each microactuator 128 of reliably sensitive materials, such as perovskite that exhibits piezoelectric effects (PZT).

Despite the use of reliably sensitive materials for the respective microactuators 128, frequency and vibration resonance of the gimbal tongue 116 can disrupt stable transducing head 110 movement and jeopardize the reading of adjacent data bits 126. It is contemplated that unwanted gimbal tongue 116 and transducing head 110 motion can be attributed to resonance of the gimbal struts 148. While necessary for structural stability, particularly during activation of the microactuators 128, the gimbal struts 148 each have a relatively small width 150, such as less than 100 micrometers, which makes placement of damping materials difficult. Hence, various embodiments are generally directed to gimbal tongue strut 148 damping configurations that reduce the gain of resonance modes and provide increasingly accurate and reliable data access performance.

FIG. 3 illustrates portions of an example transducing assembly 160 that employs gimbal strut dampers 162 in accordance with assorted embodiments. As shown by the bottom perspective view of FIG. 3, each gimbal strut 148 physically contacts a single damper 162 in a manner that provides active, and passive, control of vibrations and frequencies encountered by the gimbal strut 148.

It is noted that any number of dampers 162 can be positioned on a gimbal strut 148 and such multiple dampers 162 may have differing configurations, such as material, size, shape, and damping mode. As a non-limiting example, the transducing assembly 160 can have an active damper 162 and a passive damper 164 separated on each strut 148. The term "active" is intended to mean an electronically connected component with dynamic damping capabilities while the term "passive" is intended to mean a physical component without electronic connection or control. Hence, a gimbal strut 148, in some embodiments, can have an active damper 162 that is electronically controlled to reduce resonance peaks of the gimbal strut 148 and a passive damper 164 that damps strut frequencies based on the material property of the damper itself 164.

The position and size of the dampers 162/164 are not limited to the embodiment shown in FIG. 3, but can provide heightened data access performance for the assembly 160 when the passive damper 164 is positioned proximal the load beam 114 and when the active damper 162 is positioned distal the load beam 114, as illustrated. The respective dampers 162/164, in other embodiments, can be placed on different surfaces of the gimbal strut 148, such as on the air bearing side 130 or load beam side 132 of the gimbal tongue 116. It is noted, but not required, that the various dampers 162 are positioned at matching positions on opposite struts 148 in a symmetrical configuration about the longitudinal axis (parallel to the X axis) of the flexure 116.

Regardless of the position and size of the respective dampers 162/164, the material construction of the damper(s) 162/164 onto the relatively narrow gimbal strut 148 can determine the damping characteristics, and operational range, of the transducing assembly 160. By forming a damper 162/164 with lithography associated with circuit construction, the damper 162/164 can physically adhere to the material of the gimbal tongue 116, such as stainless steel, while being physically precise enough to provide efficient damping of selected strut frequencies and vibrations.

In some embodiments, a damper 162/164 is incorporated into a trace gimbal assembly 166 that electrically connects various aspects of the transducing assembly 160 to a local controller located off the actuating transducing assembly 160. The ability to select the number, size, position, material, and mode of damping for the transducing assembly 160 allows for a diverse range of vibration control and tuning that provide optimal transducing head 110 stability and data access performance.

Figure 4:
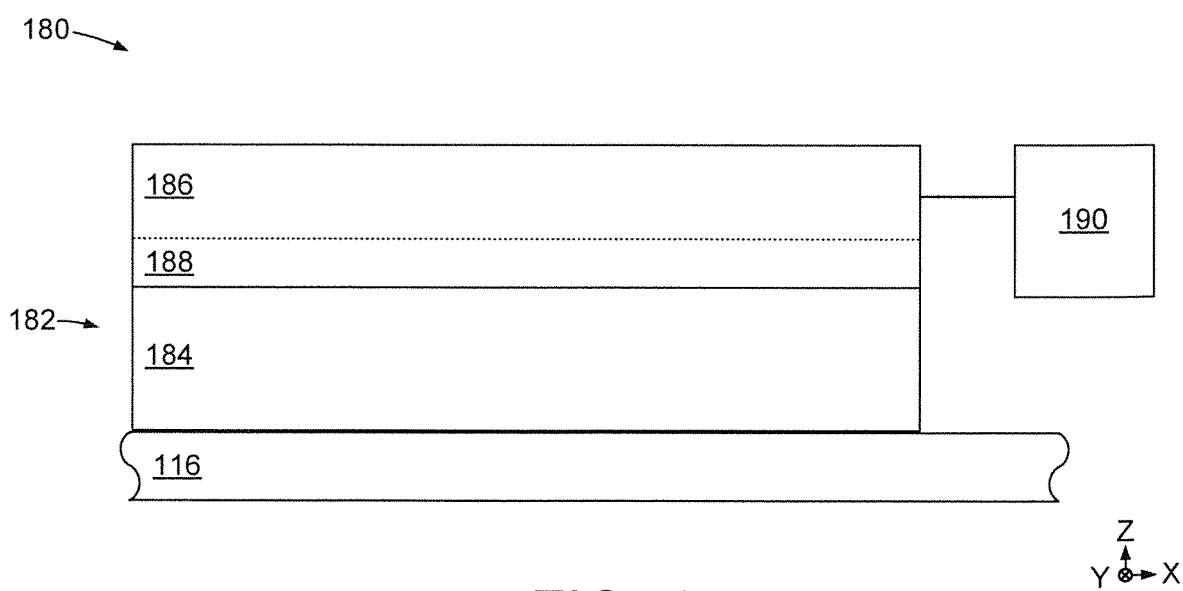
FIG. 4 shows a side view representation of a portion of an example damping system that can be employed in a transducing assembly.

FIG. 4 displays a side view line representation of a portion of an example transducing suspension 180 configured in accordance with various embodiments. A damper 182 is positioned in physical contact with a strut 148 of a gimbal tongue 116 to alter the resonance of the strut 148. It is contemplated that the damper 182 is deposited via lithography and/or 3D printing of different layers directly onto the strut 148. The damper 182 may, alternatively, be formed as part of a trace gimbal assembly 166 that is attached to the strut 148 via one or more adhesives.

Although not required or limiting, one or more damping layers 184 of the damper 182 can provide active, or passive, damping characteristics due, at least in part, to the material configuration of the damping layer(s) 184. The damping layer 184 may consist of a polymer or other material that exhibits viscous and elastic characteristics when undergoing physical deformation. In some embodiments, a damper layer 184 comprises a piezoelectric polymer, such as a polyvinylidene fluoride film, that can be deposited with lithography, 3D printing, or other micron-scale deposition process, similarly to the formation of polyimide. Such piezoelectric material may, or may not, be poled via application of an electric field to allow the damper layer 184 to transition mechanical energy to electrical energy, and vice-versa.

At least one electrode 186 can be subsequently formed in contact with the damping layer 184 to allow electrical signals to flow to, and from, the damper 182 to provide active strut 148 damping. It is noted, but not required, that one or more seed layers 188, such as nickel or other suitable metals, can be created prior to creation of the electrically conductive electrode 186. The electrode 186 allows for the electrical connection of the damper layer 184 to one or more damping components 190, such as a resistor, inductor, amplifier, or capacitor. The connection of a damping component 190 allows active damping to be conducted on the strut 148 by dynamically controlling the mechanical reactions of the damping layer 184 in response to encountered frequencies, motion, and vibrations.

In an active damping configuration, one or more damping components 190 can be connected in series, or parallel, to a damper 182 so that electrical energy originating from motion of the strut 148 via the damper 182 is consumed to alter the severity, and possibly duration, of the strut 148 motion. Hence, the electrical characteristics of the connected component(s) 190 can be tuned with respect to the construction, and position, of a damper 182 to induce, and alter, mechanical operation of the damper 182 in response to certain electrical signals generated by the damper 182.

Figure 5:
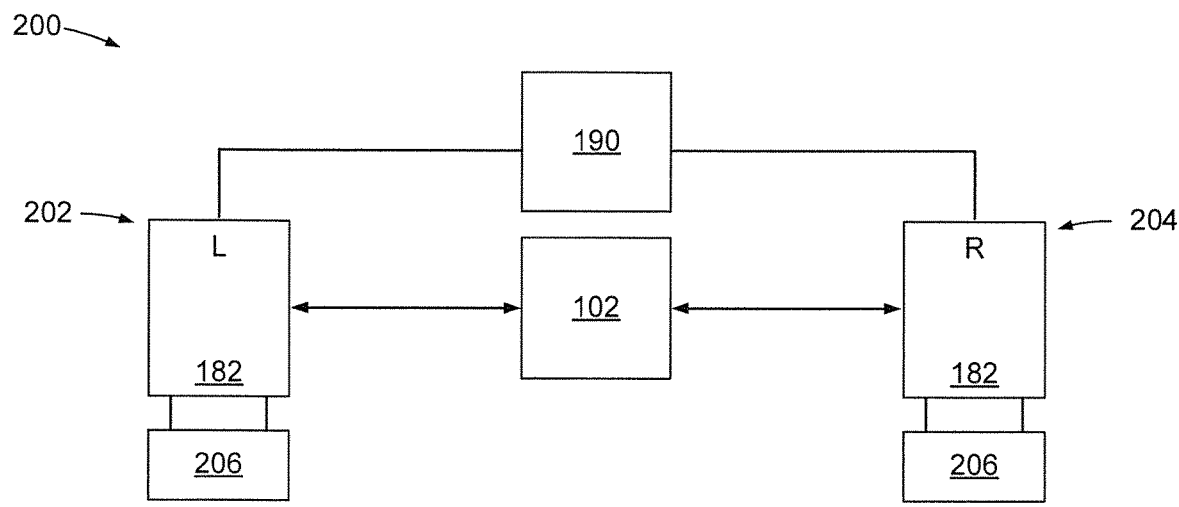
FIG. 5 illustrates electronic schematics of an example transducing assembly that may be employed in the data storage device of FIG. 1.

FIG. 5 depicts portions of an example damping system 200 that can be utilized in a transducing assembly, and data storage device, in accordance with some embodiments. The damping system 200 can have any number of dampers 182 positioned in contact with separate regions of a gimbal flexure tongue 116 and tongue strut 148.

In some embodiments, separate dampers 182 can operate as sensors to detect operational, and conditional, data about a transducing assembly in real-time. For example, the non-limiting damping system 200 of FIG. 5 shows how a left damper 202 can be positioned on a left gimbal strut 148 and a right damper 204 is positioned on a different gimbal strut 148 to respectively detect vibrations and other operational conditions proximal the left, or right, sides of the slider/head. Such detected data can be transmitted to one or more controllers, such as a local controller 102, so that the data can be processed and computed to optimize current, and future, operation of the transducing assembly.

For instance, the right damper 204 may collect operational data while the left damper 202 is dynamically controlled in view of the collected data by the controller 102 to alter the resonance of portions of the gimbal tongue 116 to provide stable, accurate transducing head positioning. The collected operational data from a damper 202/204 can be employed by the controller 102 for active noise cancellation, in some embodiments, by inverting detected frequencies and/or phase from one side of a gimbal tongue flexure 116 to induce damper 182 mechanical motion on the other side of the flexure 116. Hence, connection of the dampers 182 to a controller 102 allows for intelligent interpretation and utilization of the damper's capabilities to increase data access performance of the transducing assembly.

With the connection of one, or more, dampers 182 to at least one electrical damping components 190, provide active management of encountered mechanical motion without engagement of the controller 102. That is, the damping components 190 can be tuned with a predetermined electrical characteristic, such as resistance, that is static and dynamically controls how a damper 182 reacts to encountered mechanical motion of the gimbal tongue flexure 116. It is contemplated that the respective dampers 202/204 can be connected to independent damping components 206 alone, or in combination with collective components 190, which allows for different electrical configurations, and active resonance alteration between the dampers 202/204.

As an example, vibrations of a flexure 116 can generate mechanical motion of a damper 182 that produces electrical signals consumed by the connected damping component(s) 190 based on the electrical characteristics of the component(s) 190, which induces a physical resistance to the flexure 116 motion by the damper 182. Therefore, the damping system 200 can be a close-loop that is passive with respect to the system controller 102 while being active with respect to dynamically altering of the resonance of a gimbal tongue flexure 116.

While various embodiments are directed to active dampers, it is noted that one or more dampers of the damping system 200 can be non-active. Such non-active configuration is intended as a non-electrically connected polymer material attached to a gimbal tongue strut 148 to alter at least the resonance of the flexure 116 compared to if the flexure did not have the non-active damper.

Figure 6:
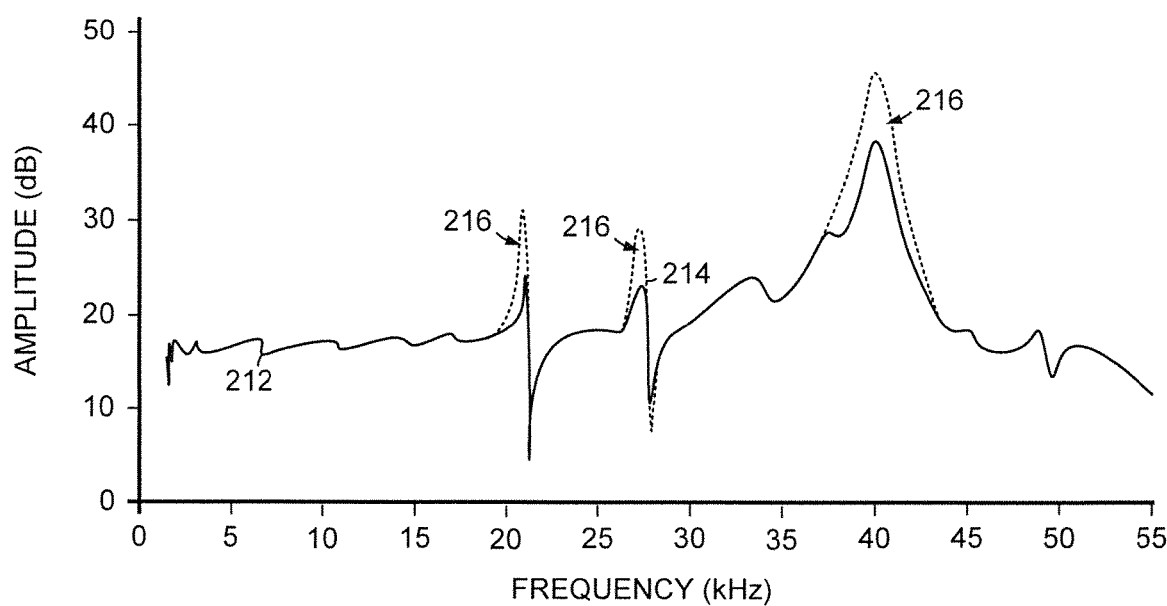
FIG. 6 plots operational data corresponding to an example transducing assembly utilized in accordance with various embodiments.
Figure 7:
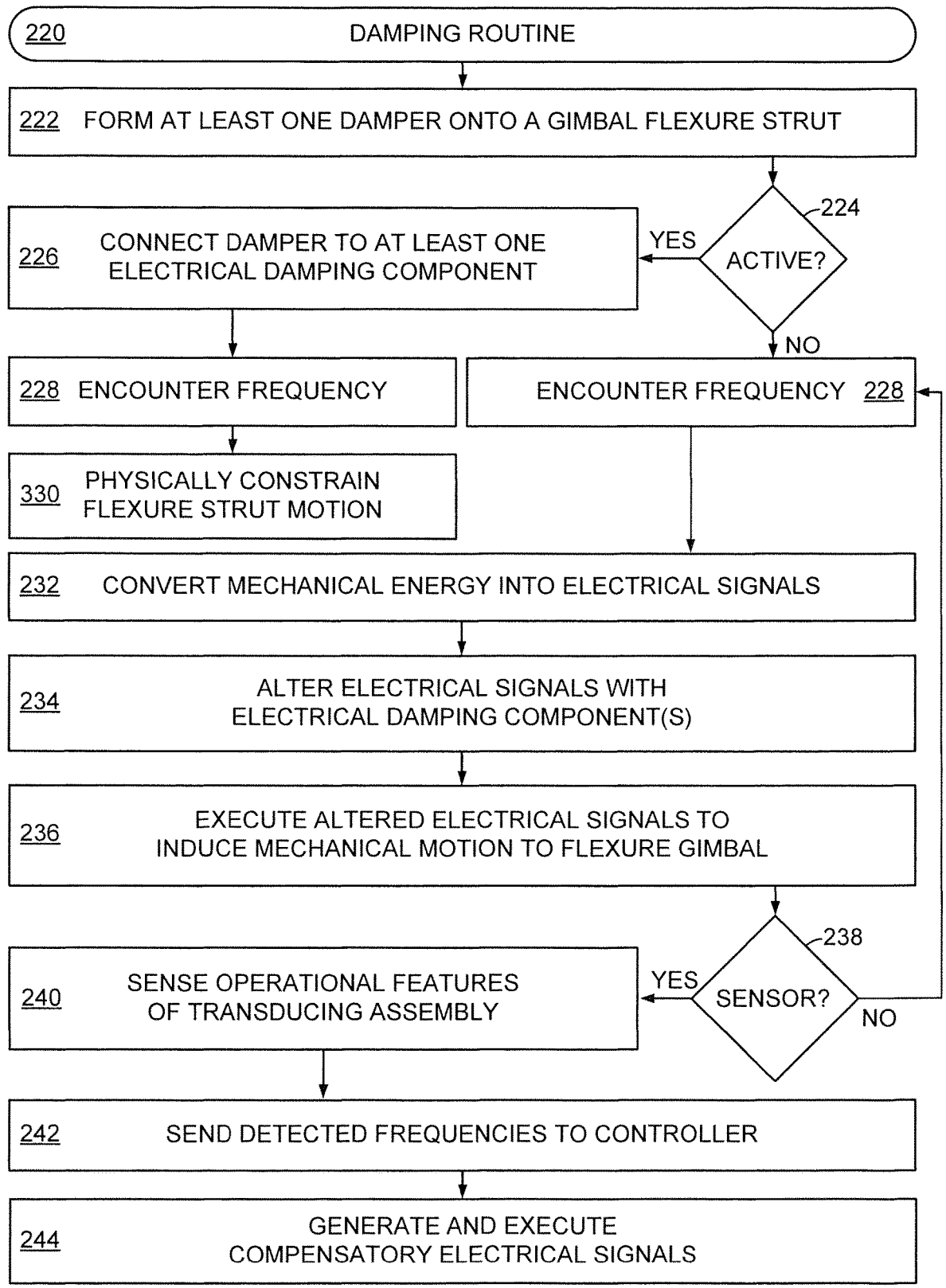
FIG. 7 is a flowchart of an example damping routine that can be carried out by the assorted embodiments of FIGS. 1-6.

FIG. 6 plots operational data for an example transducing assembly employing a tuned damping system. The tuned damping system may comprise one or more active, and/or non-active, dampers attached to a gimbal tongue strut. The dampers may be incorporated into the trace gimbal assembly or independently formed on the flexure to alter how the flexure, and particularly the struts, react to encountered noise, frequencies, and vibrations.

Solid line 212 conveys how a transducing assembly can react to various frequencies by employing a damping system arranged in accordance with various embodiments. In comparison, segmented line 214 conveys frequency response of a transducing assembly without any dampers attached to a flexure strut. The assorted reductions in the gain of resonance modes, as shown by regions 216, show how a tuned damping system can optimize transducing assembly stability and accuracy across a diverse range of encountered frequencies.

An example damping routine 220 is displayed in FIG. 6 and conveys how a damping system can be utilized to optimize data access operations of a transducing assembly in a data storage device. At least one damper is formed in step 222 onto a gimbal flexure strut of a transducing assembly. The formation may provide an active damper or a non-active damper. Decision 224 determines if an active damper is to be provided. If so, step 226 connects a damper to at least one electrical damping component.

If a non-active damper is to be provided from decision 224, the damper constructed in step 222 remains without an electrical connection. It is noted that step 222 can be repeated any number of times to construct any number of active, and non-active, dampers attached to various regions of a gimbal flexure strut, such as on symmetrical left and right strut portions of a flexure about the longitudinal axis of the flexure. The formation of one or more dampers allows the transducing assembly to be deployed to conduct data access operations, such as data reads and writes to an adjacent data storage medium.

At some point after deployment, the gimbal struts will encounter frequencies in step 228. It is contemplated that active and non-active dampers can concurrently encounter matching, or dissimilar, frequencies in step 228. With non-active dampers, step 230 physically constrains flexure strut motion, vibration, and frequencies in accordance with the physical characteristics of the damper. Meanwhile, an active damper will convert the mechanical energy exerted on the damper by the flexure strut by the encountered frequencies into electrical signals in step 232. Those electrical signals are subsequently altered in step 234 by the electrical damping component(s) connected to the damper(s) in step 226 in accordance with the electrical characteristics of the damping component(s).

The alteration of the electrical signals in step 234 cause the connected damper to actively resist the vibration, motion, and frequency of the flexure strut in step 236 with induced mechanical motion dictated by the altered electrical signal. The active, and non-active, alteration of physical motion of the flexure strut in steps 228-236 can be undertaken any number of times, either continuously or sporadically.

In some embodiments, one or more dampers are utilized as a sensor to detect operational conditions of a transducing assembly. Decision 238 evaluates if such damper sensing is appropriate. If so, step 240 senses at least one operational frequency of a gimbal flexure associated with flexure motion, such as vibration and/or movement, via the mechanical-to-electrical translation facilitated by the material construction of an active damper. Any detected frequencies are then sent to a controller in step 242 for processing that results in the generation of at least one compensatory electrical signal from the controller in step 244 that induces physical damper motion in step 246 to mitigate the effects of the detected flexure frequency.

It is contemplated that the controller generates electrical signals in step 244 that have an opposite mechanical phase to the detected frequencies so that the execution of damper mechanical energy in step 244 is out-of-phase, and acts to cancel, with the detected physical flexure motion. The ability to process real-time detected frequencies and induce subsequent damper mechanical motion to counter, and possibly cancel, the detected frequencies allows a transducing assembly to maintain stable, accurate, and precise transducing head position despite encountering a diverse range of operational frequencies.

Through the various embodiments of the present disclosure, a damping system can be employed to alter the physical response of a transducing assembly to encountered frequencies. By tuning the number, size, position, construction, and operation of various dampers, data access operations can be optimized by altering how a gimbal flexure tongue physically reacts to encountered frequencies. The selection of active and/or non-active dampers allows a damping system to be tuned with differing capabilities to alter at least the resonance of the gimbal flexure tongue, such as reduce the gain of resonance modes.

What is claimed is:

1. An apparatus comprising:
   a gimbal tongue flexure suspended from a load beam;
   a transducing head mounted to the gimbal tongue flexure, the transducing head separated from a magnetic recording medium by an air bearing; and
   a first active damper positioned on a first strut of the gimbal tongue flexure, the first active damper comprising a damping layer physically contacting the first strut, the damping layer separating an electrode from the first strut.

2. The apparatus of claim 1, wherein a second active damper is positioned on a second strut of the gimbal tongue flexure.

3. The apparatus of claim 2, wherein the first and second active dampers are arranged symmetrically about a longitudinal axis of the gimbal tongue flexure.

4. The apparatus of claim 1, wherein a seed layer is disposed between the damping layer and the electrode.

5. The apparatus of claim 1, wherein the seed layer is metallic.

6. The apparatus of claim 1, wherein the electrode is electrically connected to at least one damping component.

7. The apparatus of claim 6, wherein the at least one damping component is a resistor.

8. The apparatus of claim 6, wherein the at least one damping component is an inductor.

9. The apparatus of claim 2, wherein the first and second active dampers are each connected to at least one damping component.

10. The apparatus of claim 2, wherein the first active damper is connected to a first damping component and the second active damper is connected to a second damping component, the first and second damping components being different.

11. The apparatus of claim 1, wherein a non-active damper is positioned on the first strut, separated from the first active damper.

12. An apparatus comprising:
    a gimbal tongue flexure suspended from a load beam;
    a transducing head mounted to the gimbal tongue flexure, the transducing head separated from a magnetic recording medium by an air bearing;
    a first non-active damper positioned on a strut of the gimbal tongue flexure; and
    a second non-active damper positioned on the first strut, separated from the first non-active damper.

13. The apparatus of claim 12, wherein a second non-active damper is positioned on a second strut of the gimbal tongue flexure.

14. The apparatus of claim 13, wherein the first and second non-active dampers are arranged symmetrically about a longitudinal axis of the gimbal tongue flexure.

15. The apparatus of claim 12, wherein the second non-active damper is positioned closer to the transducing head than the first non-active damper.

16. A method comprising:
    arranging a first active damper on a first strut of a gimbal tongue flexure suspended from a load beam, the gimbal tongue flexure supporting a transducing head an air bearing distance from a magnetic recording medium;
    encountering at least one frequency with the first active damper;
    converting the at least one frequency to an electrical signal with the first active damper;
    altering the electrical signal with a damping component connected to the first active damper; and
    inducing mechanical motion of the first active damper with the altered electrical signal, the mechanical motion altering physical motion of the gimbal tongue flexure.

17. The method of claim 16, wherein the altered physical motion of the gimbal tongue flexure changes a resonance mode of the gimbal tongue flexure.

18. The method of claim 16, wherein the first active damper is connected to a controller and at least one damping component.

19. The method of claim 16, wherein a second active damper is positioned on a second strut of the gimbal tongue flexure, the second active damper connected to a controller.

20. The method of claim 19, wherein the controller generates a compensatory signal from the electrical signal from the first active damper, the compensatory signal corresponding with mechanical motion of the second active damper that cancels the at least one frequency.

* * * * *